Oct. 20, 1964     W. ZAPP     3,153,375
PHOTOGRAPHIC CAMERA
Filed June 24, 1963
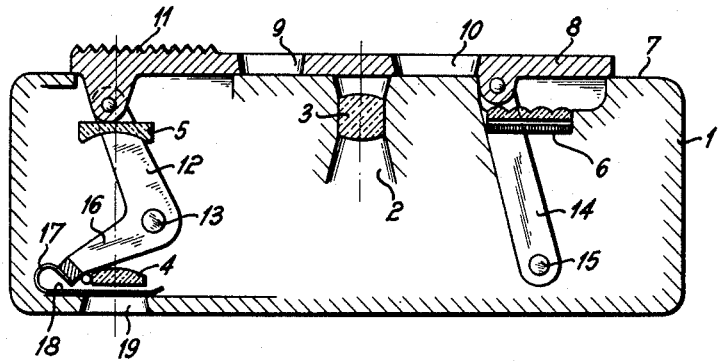
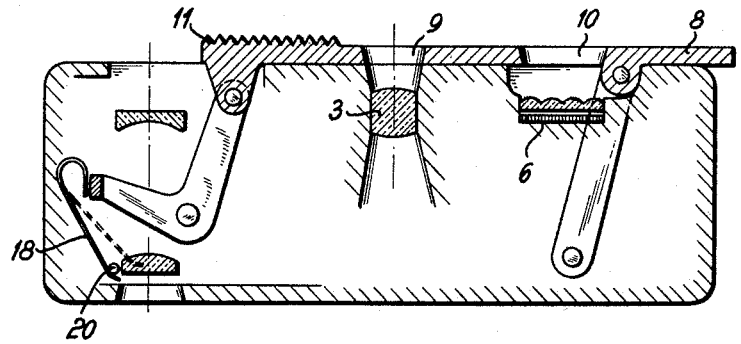
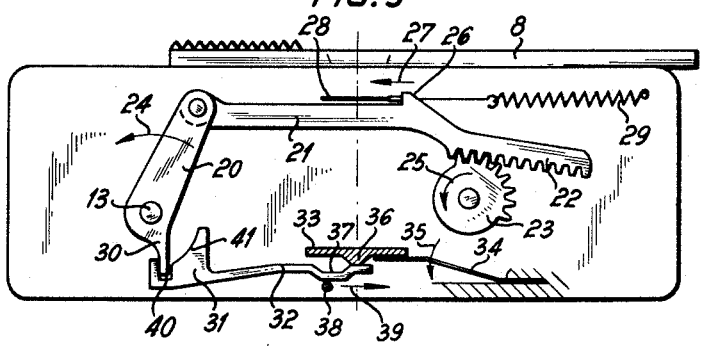

United States Patent Office 3,153,375
Patented Oct. 20, 1964

3,153,375
PHOTOGRAPHIC CAMERA
Walter Zapp, Ebenau, Oberegg, Switzerland, assignor to Minox G.m.b.H., Giessen-Heuchelheim, Germany, a German company
Filed June 24, 1963, Ser. No. 290,097
8 Claims. (Cl. 95—31)

The invention relates to a photographic camera which is to be manufactured preferably as a miniature camera in especially small dimensions and which contains a miniature, rigidly mounted, non-adjustable objective lens for the exposure of an especially small film strip removably inserted into the camera by means of a small magazine, said film strip being stepwise transported by a relative movement between two casing parts which by their relative movements in opposite directions close and uncover the optical openings of the camera.

As shown in Minox Patent 2,169,548, it is known to construct such miniature camera from two telescopically mounted rod-like casing parts, the one of which contains the objective lens, a view finder arranged parallel to the objective lens, the bearings for the film magazine, the exposure channel with film pressure plate and the objective shutter with the time-adjustment device and its accessories. The other casing part is provided at its front wall to be directed towards the object to be photographed with a wall opening and this part opens or closes the optical openings by its longitudinal displacement transversely to the optical axes. The opening movement of the telescopically engaging casing parts is used for setting the shutter of the objective which shutter consists of a spring-loaded lamella blade, while the closure movement of the casing parts is used for the stepwise transportation of the film strip. Such known miniature camera has the disadvantages that it needs expensive and difficult precision work for the light-tight manufacture of the telescopically engaging casing parts and that the light-tight precision fitting of the displaceable casing parts needs a substantial force for opening and closing the camera which is a disadvantage for the small operation gears and switching devices disposed within the camera casing. A further disadvantage is that in opening and closing the camera the high sliding resistance requires the camera to be seized and operated by its user with both hands.

It is one object of the present invention to alter the construction and operation means of such miniature cameras of the Minox-type in such manner that the expensive light-tight precision guiding needed for the telescopical movement of its casing parts can be avoided, thus reducing substantially the difficulties and costs of manufacture.

A further object of the present invention is directed to constructing the improved camera in such way that it can be opened and closed at substantial reduced forces of operation by merely one hand of the operator.

On equipment of the altered miniature camera with a view finder and with an exposure meter it is a further object of this invention to arrange these two accessories with respect to the optical main opening formed by the camera objective lens, in such way that both accessories will be opened and closed at the same time when the objective will be uncovered or closed, respectively, thus having the openings of these accessories in a light-tightly closed protected position during non-use of the camera while bringing them automatically to readiness for operation on revealing the objective lens.

These and other objects of the present invention will become clear from the following description of an example for the realization of the improved miniature camera according to the present invention, which has been shown in strongly enlarged diagrammatical views in the annexed drawings, in which FIG. 1 shows the closed camera casing in a longitudinal section parallel to the plane containing the objective lens axis, said section showing some interior elements lying in that plane;

FIG. 2 shows the same sectional view in the opened position of the casing when the camera is ready for use; and FIG. 3 is a diagrammatical longitudinal section in another plane parallel to the plane of FIG. 2, also in the opened position of the camera ready for exposure.

According to FIGS. 1–3 the box-like camera casing 1, the dimensions of which correspond in fact substantially to those of the known Minox miniature camera, comprises nearly midway of its length an image-channel 2 connecting an objective lens 3, furthermore a view finder with ocular lens 4 and finder lens 5 on the one side and an exposure meter with light sensitive meter cell 6 at the other side of the image channel 2. The objective lens 3, the finder lens 5, and the light sensitive meter cell 6 are arranged behind the front surface of the camera casing which for the exposure is to be directed towards the object to be exposed, said front surface being one of the two opposite small longitudinal outer surfaces of the camera casing. On this longitudinal front surface of the camera casing a cover plate 8 is seated, which is provided with two openings 9 and 10. This plate closes in the position shown in FIG. 1 the view finder, the image channel, and the light meter cell. At the end which is covering the view finder the cover plate 8 is provided at its outer surface with serrations 11 improving the user's grip of the plate.

In the area of the view finder the cover plate 8 is provided with an inwardly extending projection by which it is articulated to the one arm 12 of an angle lever which is rigidly fixed at its apex to a switch shaft 13 rotatably mounted to the camera casing. At its other end the cover plate 8 is articulated in the area of the light meter cell 6 to a link 14 which is rotatably mounted to an axis 15 of the camera casing. The arm 12 of the angle lever and the link 14 form together with the casing and the cover plate 8 a link parallelogram which by longitudinal movement of the cover plate can be brought from the closing position of the latter shown in FIG. 1 to its opening or uncovering position shown in FIG. 2, in which the optical openings disposed within the front surface 7 of the camera casing, formed by the light entrance opening of the view finder, the objective lens and the light measuring cell, are open. In this open position of the cover plate 8 its opening 9 is registering with the image channel and objective 3 and its opening 10 is registering with the opening of the light measuring cell 6, while the view finder has become open by the fact that the end edge 15 of the cover plate 8 has been moved across the entrance opening of the view finder 4, 5.

The articulation of the cover plate 8 to the arm 12 of the angle lever and to the link 14 has the effect that during its longitudinal movement from the closing position according to FIG. 1 to its open position according to FIG. 2 and inversely, the cover plate 8 is slightly lifted away from the front surface 7 of the camera casing because the arm 12 of the angle lever and the link 14 each are moving with their ends articulated to the cover plate 8 on a circular arc around the switch shaft 13 and the link axis 15. Therefore the cover plate 8 can be moved easily and with small displacement force because it is not subjected to any substantial sliding friction on the front surface 7 of the camera casing during these movements.

The other arm 16 of the angle lever seated on the switch shaft 13 is provided with a small leaf spring 17 which is bent at its end attached to arm 16 in U-like manner in such way that in the closing position of the cover plate 8 the spring lies with its long leg 18 between the view finder ocular 4 and a sighting opening 19 of the camera casing. This leg is pressed tightly against the inner rim of the opening 19 of the camera casing. On uncovering the optical openings by longitudinal movement of the cover plate 8 from the position in FIG. 1 to that in FIG. 2, the arm 16 of the angle lever is tilted towards the front of the casing whereby the leaf spring 17 slides with its long leg 18 on a guide pin 20 and is pressed thereby closer to the left end of the camera casing than it would be if it were in its unguided natural position which is indicated in FIG. 2 by a dotted line. By this way the leaf spring 17, 18 provided for closure of the sighting opening 19 of the camera casing during non-use of the camera is moved in the smallest space and is subjected to a small pre-tension which ensures that the cover plate 8 will remain in its open position when the camera casing is turned to vertical position with the view finder at its lower end.

On switch shaft 13 which is rotated by arm 12 of the angle lever when the cover plate 8 is longitudinal displaced, is rigidly mounted at another place a two-armed operation lever 20 (FIG. 3), the upper end of which is pivotally connected to an operation rod 21. This rod is provided at its opposite end with a rack 22 engaging a non-shown gear wheel of the film take-up roller 23 of the camera, said roller being disengaged from its driving gear wheel in the one direction of rotation (clockwise) and being rotated only on rotation of the operation lever 20 in direction of arrow 24, e.g. during the displacement of the cover plate 8 from its open position shown in FIG. 2 to its closed position according to FIG. 1. Therefore by this displacement of the cover plate 8 the film take-up roller 23 is positively rotated by rack 22 in counter-clockwise direction shown by arrow 25, by which the film strip is wound up. The operation rod 21 has a projecting gripper nose 26 which on retraction of rod 21 in direction of arrow 27 seizes a lamella plate 28 of the objective shutter and displaces the latter under tensioning of a shutter spring 29.

The operation lever 20 engages with its other arm 30 the head 31 of a slide 32 which operates with its free end a plate 33, said plate being movable in direction of the axis of the objective lens for pressing the film strip against the rear end of the image channel 2 when pressure plate 33 is in the position shown in FIG. 3. The film pressure plate 33 is rigidly connected to a leaf spring 34 which is fastened at one end to the camera casing and is active in the direction of arrow 35 for retracting the pressure plate 33 from its film pressing position when the film pressure plate 33 is released by the slide 32. The movement of the pressure plate 33 into its pressing and releasing positions takes place during a short part of the rotational movement of the operation lever 20 in order to ensure that the film strip after its release by the pressure plate 33 still can be transported for a sufficient distance by the further rotational movement of the operation lever 20, by which the take-up roller 23 will be driven. In order to obtain such quick release of the film strip by a short displacement of slide 32 in its longitudinal direction the pressure plate 33 is provided at its rear surface with a central projection 36 bordered by inclined lateral surfaces, while slide 32 is provided with a V-like double crank 37 sliding on a rigid cross pin 38 of the camera casing. If by rotation of the operation lever 20 in direction of arrow 24 the slide 32 is pushed forward lengthwise in the direction of arrow 39, the pressure plate 33 slides with its projection 36 into the V-like double crank 37 of slide 32 which at the same time slides also downwards with the left hand part of its double crank on the cross pin 38, thus obtaining by a short stroke of slide 32 a double stroke of pressure plate 33. The arm 30 of the operation lever 20 engages a groove 40 in slide 32 from which it will be released on further rotation of the operation lever 20 in direction of the arrow 24. For ensuring correct re-entrance of the arm 30 into the groove 40 on rotation of the operation lever in opposite direction, the slide 32 is provided at its head 31 with a curve which is deviating from the circular path of rotation of arm 30 in such way that, after the release of arm 30 from the groove 40, slide 32 still is displaced in forward direction a small amount. By this arrangement a frictional clamping of the parts on their following return movement and possible obstruction of their re-engagement is reliably prevented.

I claim:

1. In a photographic camera, a camera casing having end walls and having a front wall provided with a row of three openings therein spaced apart longitudinally of the casing, an exposure lens mounted inside the casing behind one of said openings, a view-finder mounted inside the casing behind another of the openings, an exposure meter mounted inside the casing behind the third opening, a cover plate normally engaging the outer surface of said front wall in a position closing all of said openings, the plate being movable manually lengthwise of said row of openings to a second position, and a parallel linkage system pivotally connected to the casing and cover plate to swing the plate forward away from the casing and then back against it while the plate is being moved between said positions, the plate being provided with openings therethorugh in such locations that while it is in said second position said casing openings will be uncovered and exposed to light.

2. In a photographic camera according to claim 1, said linkage system comprising substantially parallel links pivotally connected to the casing and cover plate near the opposite ends of the plate, and a spring compressed between one of the links and the inside of the casing in a location to hold the cover plate in either of said positions.

3. In a photographic camera according to claim 1, said linkage system comprising substantially parallel links pivotally connected to the casing and cover plate near their opposite ends, the link at the view-finder end of the casing being provided with a projecting arm, and a leaf spring attached to said arm, the rear wall of said casing having a sighting opening therethrough behind the view-finder, and said spring pressing against the inner surface of said rear wall and closing said sighting opening while the cover plate is in closed position but being withdrawable from the slighting opening by said arm when the plate is moved to its second position.

4. A photographic camera according to claim 1, including movable operating elements inside said casing, and a rotatable operation shaft inside the casing for moving said elements, said linkage system being operatively connected with said shaft to turn it when the cover plate is moved.

5. A photographic camera according to claim 4, including an operation lever rigidly mounted on said shaft and engaging said operating elements to move them when the shaft is turned.

6. In a photographic camera, a camera casing having end walls and having a front wall provided with a row of three openings therein spaced apart longitudinally of the casing, an exposure lens mounted inside the casing behind one of said openings, a view-finder mounted inside the casing behind another of the openings, an exposure meter mounted inside the casing behind the third opening, a cover plate normally engaging the outer surface of said front wall in a position closing all of said openings, the plate being movable manually relative to said walls lengthwise of said row of openings far enough to uncover the opening at one end of the row, and a parallel linkage system pivotally connected to the casing and cover plate to swing the plate forward away from the casing and then back against it while the plate is being moved between said positions, the plate being provided with a pair of openings therethrough in alignment with the other two casing openings in said row while said end opening is uncovered by the plate.

7. In a photographic camera according to claim 6, said lens being between said view-finder and meter, and said one casing opening being the one in front of the view-finder.

8. In a photographic camera, a camera casing having end walls and having a front wall provided with a row of three openings therein spaced apart longitudinally of the casing, an exposure lens mounted inside the casing behind one of said openings, a view-finder mounted inside the casing behind another of the openings, an exposure meter mounted inside the casing behind the third opening, a cover plate normally engaging the outer surface of said front wall in a position closing all of said openings, the plate being movable manually lengthwise of said row of openings to a second position, movable operating elements inside said casing, a rotatable operation shaft inside the casing near one end and extending transversely of the cover plate for moving said elements when the shaft is turned, links rigidly connected to said shaft and pivotally connected to the adjacent end of the cover plate, links near the opposite end of the casing pivotally connected thereto and to the adjacent end of the cover plate, said links being arranged to swing the plate forward away from the casing and then back against it while the plate is being moved from either of said positions to the other, said shaft being turned by the links connected thereto during movement of the cover plate, and the plate being provided with openings therethrough in such locations that while it is in said second position said casing openings will be uncovered and exposed to light.

References Cited in the file of this patent

UNITED STATES PATENTS

| | | |
|---|---|---|
| 2,161,941 | Zapp | June 13, 1939 |
| 2,169,548 | Zapp | Aug. 15, 1939 |
| 3,073,222 | Broschke | Jan. 15, 1963 |
| 3,099,194 | Weiss et al. | July 30, 1963 |